(12) United States Patent
Hallberg et al.

(10) Patent No.: US 12,223,937 B2
(45) Date of Patent: Feb. 11, 2025

(54) METHODS AND APPARATUS FOR ACOUSTIC NOISE MITIGATION OF ELECTRONIC NOISE USING ADAPTIVE SENSING AND CONTROL

(71) Applicant: Intel Corporation, Santa Clara, CA (US)

(72) Inventors: Alan Hallberg, North Plains, OR (US); Willem M. Beltman, West Linn, OR (US); Ronit Nawoganker, Kiryat Bialik (IL); Nnennaya M. Udochu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 17/133,135

(22) Filed: Dec. 23, 2020

(65) Prior Publication Data
US 2021/0116983 A1 Apr. 22, 2021

(51) Int. Cl.
*G10K 11/16* (2006.01)
(52) U.S. Cl.
CPC .................................... *G10K 11/16* (2013.01)
(58) Field of Classification Search
CPC ............... G10K 11/16; G10K 11/1752; G10K 2210/11; G10K 2210/3031; G10K 2210/30351; G06F 1/3206
(Continued)

(56) References Cited

U.S. PATENT DOCUMENTS 8,644,524 B1 * 2/2014 Malachowsky .. G10K 11/17873
381/71.13
2003/0227281 A1 * 12/2003 Nguyen .................. G06F 1/324
323/282
(Continued)

FOREIGN PATENT DOCUMENTS

CN          101578848 A       11/2009
CN          103329147 A        9/2013
(Continued)

OTHER PUBLICATIONS

International Searching Authority, "International Search Report," issued in connection with International Patent Application No. PCT/US2021/051476, mailed Jan. 5, 2022, 4 pages.
(Continued)

*Primary Examiner* — Jeremy A Luks
(74) *Attorney, Agent, or Firm* — Hanley, Flight & Zimmerman, LLC

(57) ABSTRACT

Methods, apparatus, systems and articles of manufacture for acoustic system noise mitigation are disclosed. An example apparatus includes a sound sensor and one or more electronic components. The apparatus also includes a background noise analyzer to obtain sensor data indicative of background noise in an environment of the apparatus from the sound sensor. The apparatus also includes a system noise analyzer to select a first system noise profile indicative of acoustic noise associated with operating the one or more electronic components according to a first system configu-
(Continued)

ration. The apparatus also includes a system noise controller to operate the one or more electronic components according to the first system configuration of the first system noise profile.

22 Claims, 8 Drawing Sheets

(58) Field of Classification Search
USPC .......................................................... 381/57
See application file for complete search history.

(56) References Cited

U.S. PATENT DOCUMENTS

| | | |
|---|---|---|
| 2005/0107129 A1 | 5/2005 | Kaewell et al. |
| 2006/0116175 A1 | 6/2006 | Chu |
| 2008/0161063 A1 | 7/2008 | Schuster et al. |
| 2009/0164772 A1 | 6/2009 | Karkaria et al. |
| 2011/0273213 A1 | 11/2011 | Rama |
| 2012/0134548 A1 | 5/2012 | Rhoads |
| 2012/0165068 A1 | 6/2012 | Glebe |
| 2018/0180465 A1* | 6/2018 | Papanagiotou ..... G06F 11/3058 |
| 2019/0130925 A1 | 5/2019 | Parikh |
| 2019/0139533 A1 | 5/2019 | Kacelenga et al. |
| 2021/0116983 A1 | 4/2021 | Hallberg et al. |

FOREIGN PATENT DOCUMENTS

| | | |
|---|---|---|
| CN | 108040489 A | 5/2018 |
| EP | 2469827 A1 | 6/2012 |
| KR | 20070063691 | 6/2007 |
| KR | 20080032570 | 4/2008 |
| WO | 2006057770 A2 | 6/2006 |
| WO | 2011140147 | 11/2011 |

OTHER PUBLICATIONS

International Searching Authority, "Written Opinion," issued in connection with International Patent Application No. PCT/US2021/051476, mailed Jan. 5, 2022, 6 pages.

International Bureau, "International Preliminary Report on Patentability," issued in connection with International Patent Application No. PCT/US2021/051476, mailed on Jul. 6, 2023, 8 pages.

European Patent Office, "Extended European Search Report," issued in connection with European patent application No. 21198549.4, issued on Mar. 10, 2022, 76 pages.

European Patent Office, "Communication under Rule 71(3) EPC—Intention to Grant," issued in connection with European Patent Application No. 21 198 549.4-1224, dated Jan. 9, 2024, 46 pages.

European Patent Office, "Decision to Grant a European Patent Pursuant to Article 97(1) EPC," issued in connection with European Patent Application No. 21198549.4, dated May 10, 2024, 2 pages.

Taiwan Intellectual Property Office, "Notice of Preliminary Review Opinion and Search Report," issued in connection with Taiwanese Patent Application No. 106146289, dated Oct. 28, 2024, 13 pages. [English language machine translation included.].

* cited by examiner

METHODS AND APPARATUS FOR ACOUSTIC NOISE MITIGATION OF ELECTRONIC NOISE USING ADAPTIVE SENSING AND CONTROL

FIELD OF THE DISCLOSURE

This disclosure relates generally to acoustic noise mitigation, and, more particularly, to methods and apparatus for acoustic noise mitigation of electronic noise using adaptive sensing and control.

BACKGROUND

Computing devices facilitate various user activities such as communicating over a network (e.g., Internet), searching for information in the network, preparing and/or viewing documents, among other examples. In some scenarios, a computing device may produce audible acoustic noise due to vibrations and/or other physical movement of various electronics in the device.

Figure 1:
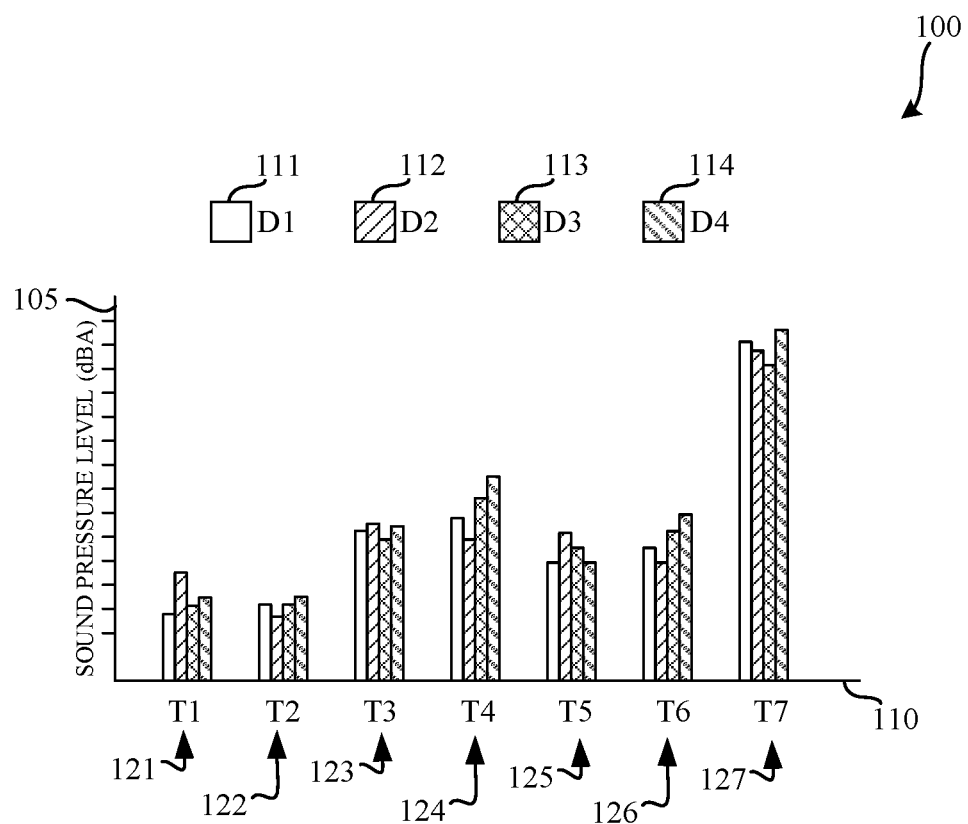
FIG. 1 is a graph illustration of background noise levels detected at different times-of-day.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

In some examples, microprocessors and other logic circuitry may employ rapid and frequent state transitions to provide greater battery life and computing performance. In these examples, some electronic components such as decoupling capacitors (e.g., multi layer ceramic capacitors, etc.) in such circuitry may receive electrical signals that produce audible acoustic noise.

Some examples disclosed herein may involve a computing device that automatically adjusts system configuration parameters (e.g., state transition frequency, etc.) to control acoustic system noise emitted from electronic components of the computing device. For example, the computing device may be configured to operate according to a higher system performance configuration (associated with higher acoustic system noise) in environments having relatively higher background noise levels. Similarly, for example, the computing device may operate at a lower system performance level (associated with lower system noise from the electronic components) in environments having relatively lower background noise levels.

FIG. 1 is a graph illustration 100 of background noise levels detected at different times-of-day. The graph 100 includes vertical axis 105 that represents sound pressure levels detected by devices. A horizontal axis 110 represents different times of day. In the illustrated example of FIG. 1, four devices are represented, D1 111, D2 112, D3 113, D4 114 at the different times-of-day T1 121, T2 122, T3 123, T4 124, T5 125, T6 126, T7 127.

By way of example, the devices could correspond to personal computing devices (or any other type of computing device) operated in different environments (e.g., home, coffee shop, office, etc.) throughout the day. In this example, the sound pressure levels indicated by the vertical axis 105 corresponds to average background noise levels measured (e.g., using microphones) by these devices when operating at corresponding times-of-day.

As such, an example system herein automatically adjusts system configuration settings (e.g., state transition frequency, voltage regulator slew rate, dynamic periodicity alteration (DPA) parameters, etc.) associated with acoustic system noise depending on the current environment in which the system is operating. For instance, device D1 111 could operate at a higher performance level when the device detects it is operating in the environment (or the time-of-day) T3 123 than when device D1 111 is operating in environment/time-of-day T2 122. In this instance, relatively higher acoustic system noise associated with operating at the higher performance level could still be lower than the background noise level expected at T3 123. For example, the higher background noise level at T3 123 could be suitable for "masking" the higher acoustic system noise expected when operating at the higher performance level. Whereas, in this example, a lower system noise level configuration could be more suitable for operating in the lower expected background noise level associated with T2 122.

Figure 2:
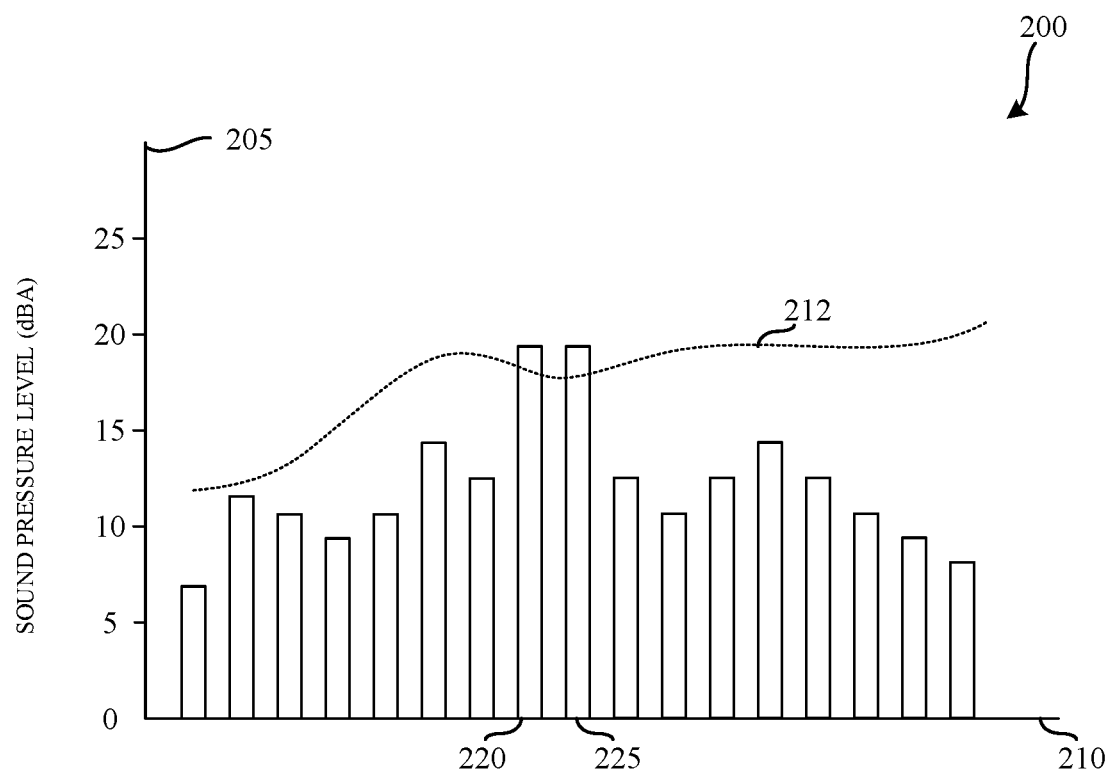
FIG. 2 is a graph illustration of example background and system noise levels in a plurality of different frequency bands.

FIG. 2 is a graph illustration 200 of example background and system noise levels in a plurality of different frequency bands. A vertical axis 205 of the graph 200 represents sound levels. A horizontal axis 210 of the graph 200 represents frequency bands. In the illustrated example of FIG. 2, frequency components are represented at one third octave band intervals. Expected system noise at those various frequency intervals is represented by vertical bars, and frequency components of background noise are represented by line 212). In the example graph of FIG. 2, system acoustic noise at frequency bands 1000 Hz (Bar 220) and 1250 Hz (Bar 225) are higher than corresponding background noise levels (see line 212) at these frequency band, even though the background noise levels at other frequency bands (e.g., 400 Hz and 500 Hz) are higher than corresponding system acoustic noise levels at those frequency bands.

Accordingly, in some scenarios, system acoustic noise may still be audible in one or more frequency bands even if the overall system noise level is lower than the overall background noise level.

To that end, some examples herein involve adjusting system configuration parameters based on background noise levels at one or more frequency bands, in addition to or instead of adjusting the system configuration parameters based on the overall background noise level.

Figure 3:
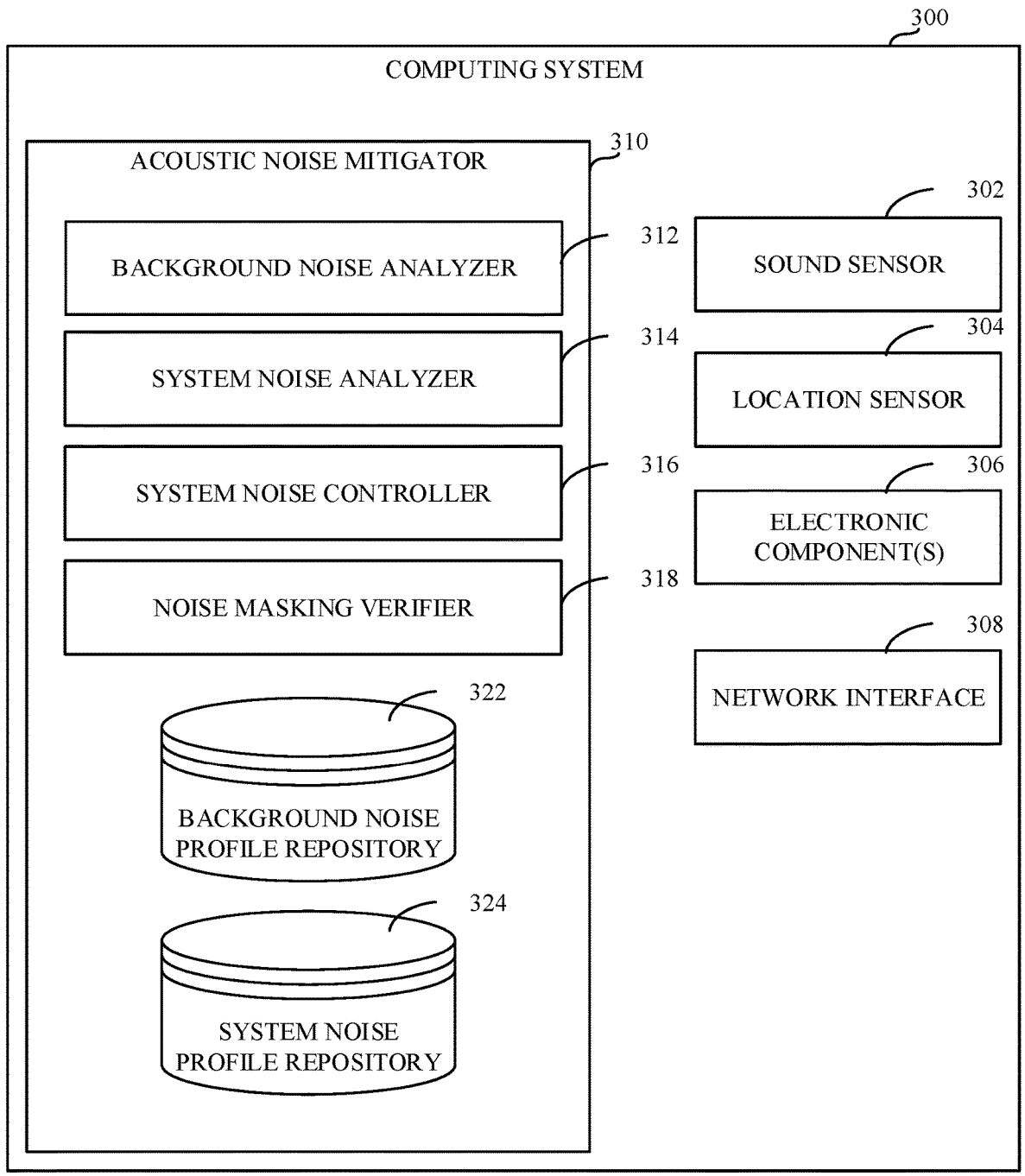
FIG. 3 is a schematic illustration of an example system constructed in accordance with teachings of this disclosure to mitigate acoustic noise of electronic components in the system.

FIG. 3 is a schematic illustration of an example computing system 300 constructed in accordance with teachings of this disclosure to mitigate acoustic noise of electronic components in the system.

In the illustrated example of FIG. 3, the computing system 300 is implemented in a computing device, such as a server computer, desktop computer, laptop computer, mobile device, internet-of-things (IoT) computing device, among other possibilities. In other examples however, one or more components of computing system 300 could instead be implemented using multiple computing devices in communication with one another.

In the illustrated example of FIG. 3, the computing system 300 includes a sound sensor 302, a location sensor 304, one or more electronic components 306, network interface 308, and an acoustic noise mitigator 310.

Sound sensor 302 includes any transducer device (e.g., microphone, etc.) configured to detect sounds (e.g., air pressure variations of a soundwave) in an environment of computing system 300 and convert the detected sounds into an electrical signal. A non-exhaustive list of example sound sensor devices includes microphones, dynamic microphones (e.g., coil of wire suspended in a magnetic field), condenser microphones (e.g., vibrating diaphragm), contact microphones (e.g., piezoelectric sensors), among others. In one example, sound sensor 302 includes a microphone that is physically coupled to computing system 300 (e.g., built-in system microphone of a computer). In an alternative example, sound sensor 302 includes an external device that is electrically coupled to computing system 300 via a wired or wireless connection.

Location sensor 304 includes any device configured to provide an indication of a geographic location of computing system 300, such as a satellite navigation sensor (e.g., global positioning system (GPS) sensor) or any other type of location sensor.

Electronic component(s) 306 could include any device configured to transmit, receive, and/or otherwise manipulate electrical signals inside computing system 300.

In some implementations, electronic components 306 include one or more voltage regulators, capacitors (e.g., power output decoupling capacitors, multilayer ceramic capacitors (MLCCs), etc.), and/or any other type of analog or digital circuitry. In one example, electronic components 306 includes circuitry mounted to a system-on-chip (SOC) substrate and/or another type of circuit substrate. For instance, electronic component(s) 306 could include interconnected circuitry arranged to perform the functions of a microprocessor device.

In some examples, electronic component(s) 306 produce audible noise associated with the electrical signals received by the electronic component(s) during operation. In one example, electronic component(s) 306 include a voltage regulator that vibrates at a particular frequency and/or amplitude based on the voltage signal received by the voltage regulator. In another example, electronic component(s) 306 include a power output decoupling capacitor that vibrates depending on voltage transitions at an input terminal of the capacitor.

Network interface 310 includes any wired and/or wireless communication device configured to communicate data between computing system 300 and a network (e.g., the Internet, etc.). To that end, one example interface 310 includes one or more wired communication devices (e.g., Ethernet communication interface, etc.) and/or wireless communication devices (e.g., antennas, WiFi interface, etc.) configured to establish a network connection with an external computing device and/or to scan the surrounding environment for presence of external computing devices (e.g., access points, etc.).

Acoustic noise mitigator 310 includes one or more hardware and/or software components configured to obtain information from any of sound sensor 302, location sensor 304, and/or network interface 308. Additionally, the acoustic noise mitigator 310 is configured to adjust and/or condition signals flowing through electronic the component(s) 306. In some examples, the acoustic noise mitigator 310 may use data from the sensors 302, 304, and/or the interface 308 as a basis for controlling characteristics of signals flowing through the electronic component(s) 306 to adjust acoustic system noise generated by the component(s) 306.

As shown in the illustrated example of FIG. 3, the acoustic noise mitigator 310 includes a background noise analyzer 312, a system noise analyzer 314, a system noise controller 316, a noise masking verifier 318, a background noise profile repository 322, and a system noise profile repository 324.

The example background noise analyzer 312 of the illustrated example of FIG. 3 obtains sensor data from the sound sensor 302 and analyzes the sensor data to determine or estimate a background acoustic noise level for an environment of the computing system 300.

In some examples, the background noise analyzer 312 causes sound sensor 302 to collect one or more sound samples (e.g., audio recording from a microphone). In some instances, the sound samples are configured to have a particular duration (e.g., one second, two seconds, three seconds, etc.). For instance, the particular duration may correspond to a same duration used by system noise analyzer when collecting measurements of system acoustic noise in another environment (e.g., in an anechoic chamber, etc.). Alternatively, in other instances, the duration of each sound sample could vary.

In some examples, background noise analyzer 312 causes sound sensor 302 to collect the sound samples periodically and/or a-periodically. For example, the background noise analyzer 312 may collect sound samples using the sound sensor 302 periodically (e.g., every 10 minutes, every 15 minutes, etc.) and/or a-periodically (e.g., in response to a triggering event). For instance, sound sampling could be performed at a relatively low rate to reduce associated power consumption (e.g., once every ten minutes). In some examples, the background noise analyzer 312 is configured to trigger collection of sound samples from sensor 302 in response to a system event (e.g., system boot up, operating system initialization, launching an application, etc.). In some examples, the background noise analyzer 312 is configured to trigger collection of sound samples by sensor 302 in response to receiving an indication of the environment of computing system 300.

For instance, the background noise analyzer 312 could detect presence of a particular network device based on data from network interface 308. The particular network device could be associated with a particular environment (e.g., wireless access point in a restaurant, etc.). In this instance, analyzer 312 associates detection of the particular network device with presence of the computing system 300 in the particular environment, and triggers sound sample data collection by sensor 302 accordingly (e.g., in response to moving from a previous environment to the particular environment, or in response to a first detection of the particular network device, etc.).

In some examples, the background noise analyzer 312 alternatively or additionally detects the environment of computing system 300 based on data from location sensor 304 (e.g., by associating a given environment with a given geographic location indicated by the location sensor 304, etc.).

In some examples, the background noise analyzer 312 is configured to estimate a background noise level in a particular environment based on one or more sound samples collected using sensor 302. In one particular implementation, the background noise analyzer 312 computes a level statistic (e.g., L90, etc.) for estimating the background noise level of a particular environment using multiple sound samples collected at different times. Referring back to FIG. 1 for instance, a background noise level of 50 dBA is estimated for a device operating at time-of-day T3 based on 90% of the of the duration of sound samples collected by the device at T3 having an acoustic noise level exceeding 50 dBA. Other example statistical measures of the background noise level based on sensor data from sound sensor 302 are possible as well. For instance, the estimated background noise level computed by analyzer 312 for a particular environment could be updated using a time weighting and/or statistical filter (e.g., to extract a slow varying metric over time).

In some examples, the background noise analyzer 312 is configured to determine background noise levels for a plurality of frequency bands based on sensor data from sound sensor 302. Referring back to FIG. 2 for instance, analyzer 312 could determine sound pressure levels in various one third octave frequency bands (e.g. 800 Hz, 1000 Hz, 1250 Hz, etc.) based on one sound sample and/or based on multiple sound samples collected in the particular environment at different times, in line with the discussion above. Additionally or alternatively, in some implementations, the background noise analyzer 312 updates and/or estimates the background noise levels in a particular environment for each of the plurality frequency bands using a statistical computation (e.g., L90, time-weighting, statistical filtering, etc.), in line with the discussion above.

In some applications, collecting short duration sound samples (e.g., 2 seconds, etc.) as well as converting the collected sound samples to spectral sound level components could facilitate preserving privacy of user information in the collected sound samples.

In some examples, the analyzer 312 is configured to store acoustic data related to the background noise measurements collected for a plurality of environments in the background noise profile repository 322. In some examples, such acoustic data may be crowd sourced and/or retrieved from a storage location in the cloud. Such crowd sourcing and/or cloud storage enables a larger sample size of background noise measurements, and/or enables an understanding of a baseline noise measurement when entering a new environment. Referring back to FIG. 1 for example, the stored acoustic data in the background noise profile repository 322 could include overall background noise level measurements and/or computations similar to the data represented in FIG. 1 for each environment associated with times-of-day T1, T2, T3, T4, T5, T6, T7. Alternatively or additionally, referring back to FIG. 2 for example, the stored acoustic data could include estimated background noise levels computed by the analyzer 312 for a plurality of frequency bands (e.g., the ⅓ octave band frequencies shown in FIG. 2).

In some examples, the background noise analyzer 312 is configured to select a background noise profile for a current environment of the computing system 300 from a plurality of background noise profiles (e.g., stored in the repository 322). For example, after initially compiling background noise level characteristics for several frequently visited environments, the acoustic noise mitigator 310 retrieves a particular background noise profile for a particular environment at a later time instead of or in addition to obtaining new sound samples for that particular environment from the sound sensor 302 when the computing system 300 returns to that particular environment.

In examples disclosed herein, the system noise analyzer 314 selects a system noise profile for operating the one or more electronic components 306, based on background noise indicated by sensor data from the sound sensor 302 (and/or a background noise profile selected by the analyzer 312). In some implementations, the system noise analyzer 314 selects the system noise profile from a plurality of system noise profiles stored in system noise profile repository 324. In some examples, the system noise profile may be retrieved from a remote storage location. Such remote storage location may be provided and/or hosted by an original equipment manufacturer (OEM) and/or other component manufacturer.

In a first implementation, each system noise profile is generated based on previously collected acoustic data obtained from sensor 302 while the computing system 300 is operating in a relatively quiet testing environment (e.g., anechoic chamber, etc.) using a particular system configuration.

For example, a voltage regulator of the component(s) 306 may be operated using a first voltage slew rate associated with a first system noise profile, and the resulting acoustic noise measured by the sensor 306 can be analyzed in a similar manner to the analysis of background noise samples described above (e.g., a system noise level could be estimated for a plurality of frequency bands, etc.). The voltage regulator may then be operated using a second voltage slew rate to generate acoustic data for a second system noise profile, and so on.

As another example, the system noise analyzer 314 could associate each system noise profile with a respective combination of dynamic periodicity alteration (DPA) parameters used to modulate electrical signals flowing through the component(s) 306. Similarly to the example above, acoustic data for each combination of DPA parameters could be obtained from the sound sensor 302 to determine a respective system noise profile.

In a second implementation, the acoustic data represented in each system noise profile is generated using a simulated system model and/or by training a neural network algorithm to infer acoustic noise output by the system based on various system configuration parameter input values (e.g., DPA parameters, voltage regulator input voltage ramp rates, etc.). In this manner, usage of the neural network algorithm allows the system to use with more data that may be collected from a manufacturer to identify acoustic noise.

The example system noise controller 316 of FIG. 3 operates the electronic component(s) 306 according to a particular system configuration associated with the system noise profile selected by the system noise analyzer 314. By way of example, the system noise controller 316 may control DPA parameters, voltage slew rates, and/or any other signal characteristics used to operate the electronic component(s) 306 according to the signal characteristics associated with the selected system noise profile. In some examples, the example system noise controller 316 operates the electronic component(s) 306 according to the selected system noise profile by updating the basic input/output system (BIOS) instructions used to operate computing system 300 during a bootup or system initialization event.

The example noise masking verifier 318 of FIG. 3 is configured to obtain verification sensor data (e.g., one or more additional sound samples) from the sound sensor 302 after the system noise controller 316 adjusts the system configuration of the electronic component(s) 306 according to the selected system noise profile indicated by system noise analyzer 314.

In one example, the noise masking verifier 318 obtains one or more sound samples collected by the sensor 306 after adjusting the system configuration parameters (e.g., DPA settings, voltage ramp rates, etc.) for operating the component(s) 306. The noise masking verifier 318 could also obtain a measurement of one or more electrical signals associated with the system configuration at which the controller 316 operates the electronic component(s) 306. For instance, the electrical signals could correspond to voltage rail signals flowing through the electronic component(s) 306 based the system configuration of the selected system noise profile.

In this example, the noise masking verifier 318 then compares characteristics of the electrical signals with corresponding acoustic signal characteristics indicated by the verification sensor data. In one implementation, the noise masking verifier 318 determines a coherence between the electrical signal and the measured acoustic noise. Further, in some implementations, the noise masking verifier 318 determine a coherence of the acoustic signal with the electrical signal at each of a plurality of frequency bands. In some instances, if the determined coherence exceeds 90% at any particular frequency band, the noise masking verifier 318 determines that the measured acoustic noise at that particular frequency band is due to system noise from the electronic component(s) 306. The acoustic noise mitigator 310 then selects a different system noise profile (and associated system configuration parameters) for operating the electronic component(s) 306. In some examples, the use of and/or inclusion of the noise masking verifier 318 in the acoustic noise mitigator 310 is optional. In this manner, the verification operations performed by the acoustic noise mitigator 310 may be omitted as well.

The example background noise profile repository 322 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example background noise profile repository 322 may be in any data format such as, for example, binary data, comma delimited data, tab delimited data, structured query language (SQL) structures, etc. While, in the illustrated example, the background noise profile repository 322 is illustrated as a single device, the example background noise profile repository 322 and/or any other data storage devices described herein may be implemented by any number and/or type(s) of memories that are located locally at the computing system and/or remote (e.g., at a cloud storage location). In the illustrated example of FIG. 3, the example background noise profile repository 322 stores background noise profiles.

The example system noise profile repository 324 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example system noise profile repository 324 may be in any data format such as, for example, binary data, comma delimited data, tab delimited data, structured query language (SQL) structures, etc. While, in the illustrated example, the system noise profile repository 324 is illustrated as a single device, the example system noise profile repository 324 and/or any other data storage devices described herein may be implemented by any number and/or type(s) of memories. In the illustrated example of FIG. 3, the example system noise profile repository 324 stores system noise profiles.

While an example manner of implementing the acoustic noise mitigator 310 is illustrated in FIG. 3, one or more of the elements, processes and/or devices illustrated in FIG. 3 may be combined, divided, re-arranged, omitted, eliminated and/or implemented in any other way. Further, the example background noise analyzer 312, the example system noise analyzer 314, the example system noise controller 316, the example noise masking verifier 318, and/or, more generally, the example acoustic noise mitigator 310 of FIG. 3 may be implemented by hardware, software, firmware and/or any combination of hardware, software and/or firmware. Thus, for example, any of the example background noise analyzer 312, the example system noise analyzer 314, the example system noise controller 316, the example noise masking verifier 318 and/or, more generally, the example acoustic noise mitigator 310 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, background noise analyzer 312, the example system noise analyzer 314, the example system noise controller 316, the example noise masking verifier 318 is/are hereby expressly defined to include a non-transitory computer readable storage device or storage disk such as a memory, a digital versatile disk (DVD), a compact disk (CD), a Blu-ray disk, etc. including the software and/or firmware. Further still, the example acoustic noise mitigator 310 of FIG. 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
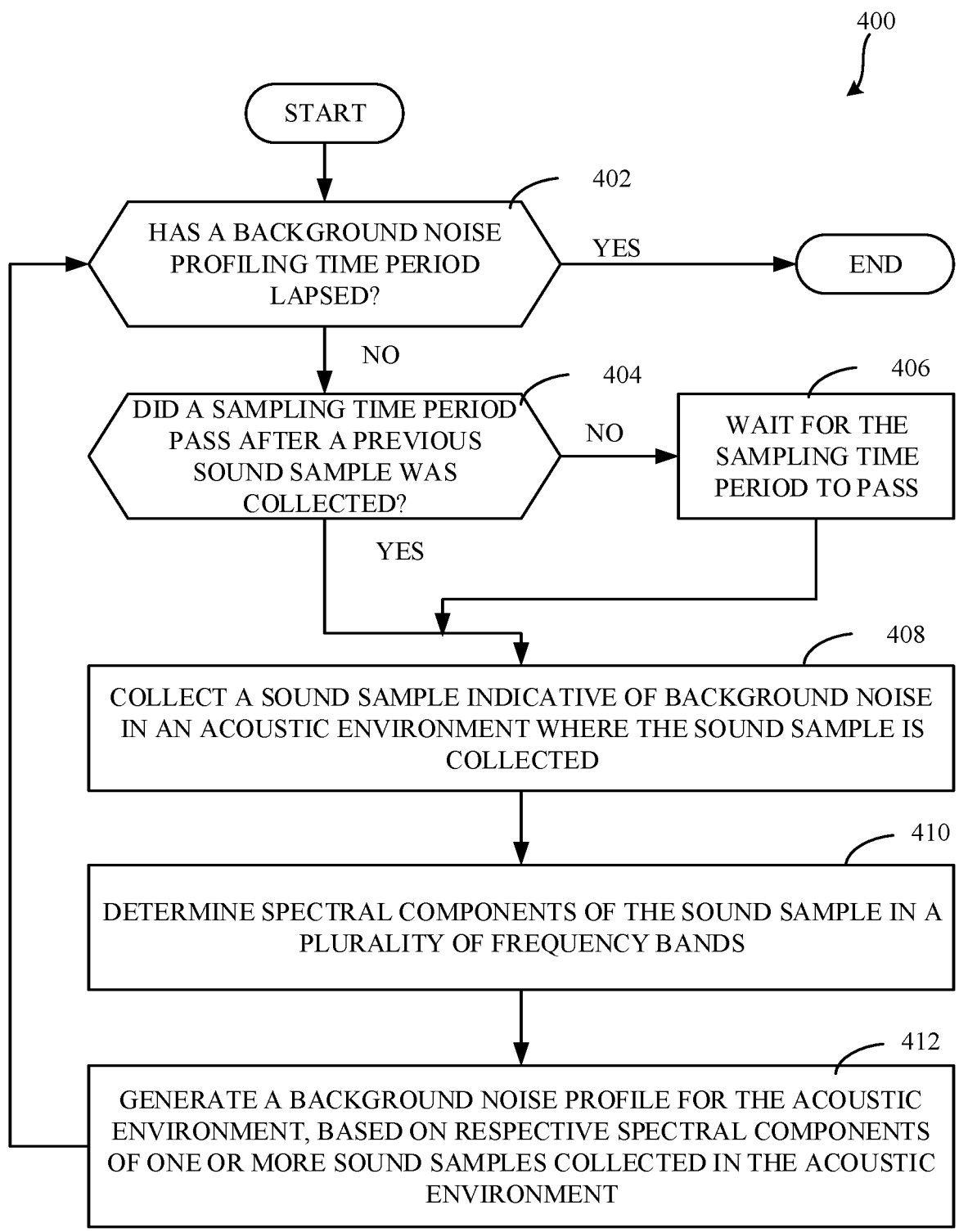
FIG. 4 is a flowchart representative of machine readable instructions which may be executed to implement the example acoustic noise mitigator of FIG. 3 to initialize and learn background noise characteristics in one or more acoustic environments.
Figure 5:
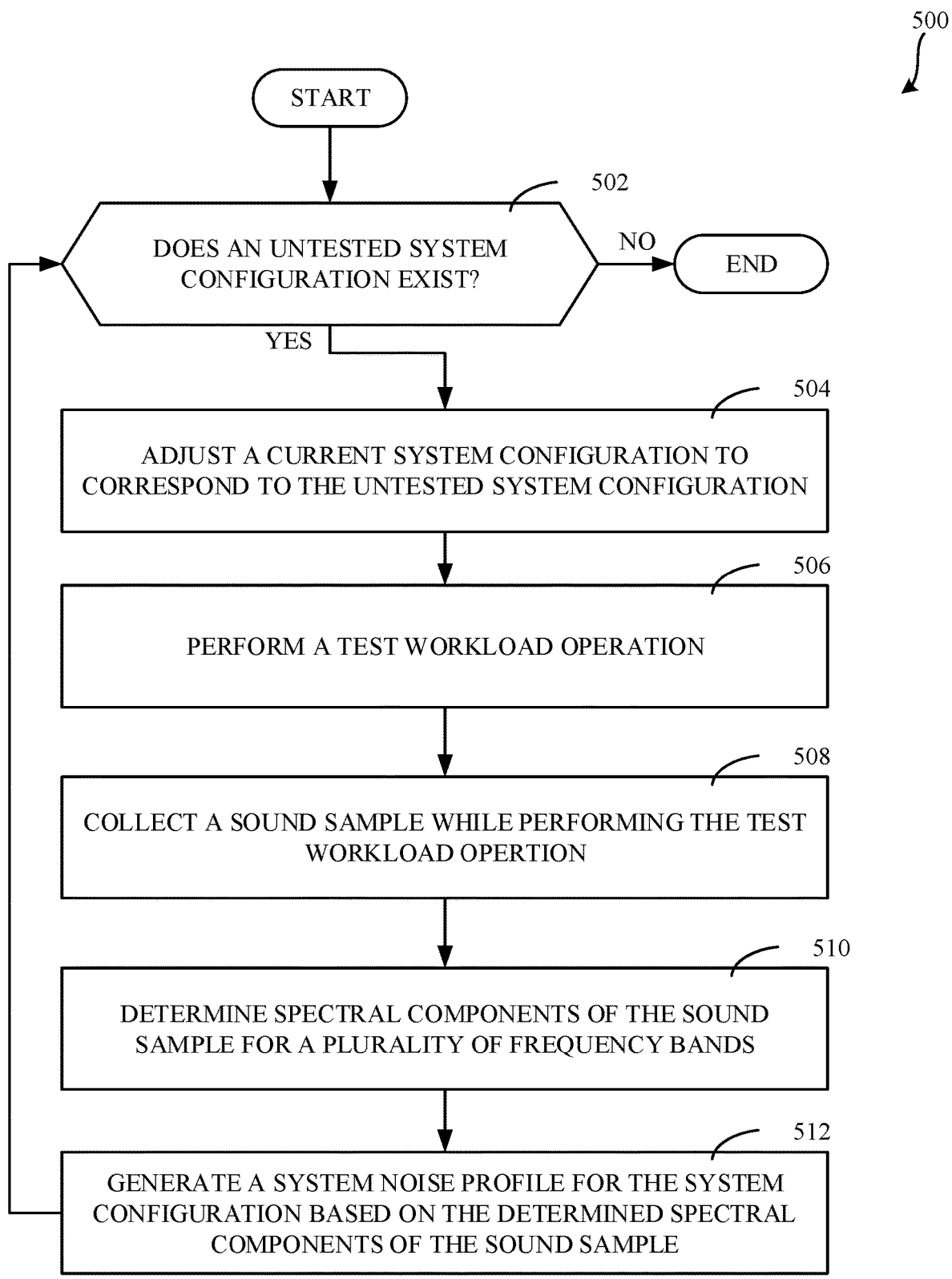
FIG. 5 is a flowchart representative of machine readable instructions which may be executed to implement the example acoustic noise mitigator of FIG. 3 to initialize and learn system noise characteristics associated with a plurality of different system configurations.

Flowcharts representative of example hardware logic, machine readable instructions, hardware implemented state machines, and/or any combination thereof for implementing the acoustic noise mitigator 310 of FIG. 3 is shown in FIGS. 4, 5, and/or 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIGS. 4, 5, and/or 6, many other methods of implementing the example acoustic noise mitigator 310 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions 400 which may be executed to implement the example acoustic noise mitigator 310 of FIG. 3. In particular, the instructions of FIG. 4 enable the acoustic noise mitigator 310 to learn and initialize background noise profiles for a plurality of acoustic environments.

At block 402, the example background noise analyzer 312 determines whether a background noise profiling time period has lapsed. The background noise profiling time period could be a predetermined period of time (e.g., particular number of days, weeks, etc.) in which the example acoustic noise mitigator is configured to learn various background noise characteristics in typical frequently visited environments (e.g., home, office, coffee shop, etc.). If the background noise profiling period has lapsed (e.g., block 402 returns a result of YES), then the background noise profile initialization process 400 terminates. If the background noise profiling period has not lapsed (e.g., block 402 returns a result of NO), then the process 400 proceeds to block 404.

At block 404, the example background noise analyzer 312 determines whether a sampling time period since a previous sound sample was collected has passed (at Block 404). For instance, the example background noise analyzer 312 could collect sound samples periodically (e.g., every 10 minutes or other sampling time period) over multiple days. Thus, if the sampling time period has passed, then a result of YES is returned at block 404 and the process 400 proceeds to block 408.

If the sampling time period has not passed (e.g., block 404 returned a result of NO), then the example background noise analyzer 312 proceeds to block 406. At block 406, the example background noise analyzer 312 waits until the sampling time period has passed before proceeding to block 408.

At block 408, the machine readable instructions 400 involve the example background noise analyzer 312 collecting a sound sample indicative of background noise in an acoustic environment where the sound sample is collected. For instance, the example background noise analyzer 312 could obtain a short sound sample (e.g., 2 seconds) from a microphone (e.g., sound sensor 302) at block 408 in every iteration of process 400 (e.g., every time block 404 returns a result of YES) to compile multiple sound samples for multiple acoustic environments in which the computing system 300 is present across different time-of-day.

At block 410, the background noise analyzer 312 determines spectral components of the sound sample in a plurality of frequency bands. Referring back to FIG. 2 for example, the background noise analyzer 312 could determine sound pressure levels (e.g., represented by the line 204) in the sound sample for each of the one third octave band frequencies shown in the horizontal axis of the graph illustration of FIG. 2.

At block 412, the background noise analyzer 312 generates a background noise profile for the acoustic environment based on respective spectral components of one or more sound samples collected in the acoustic environment. By way of example, the background noise analyzer 312 could identify multiple sound samples collected at a same acoustic environment (e.g., office, coffee shop, etc.). In this example, the analyzer 312 then computes a statistical estimation (e.g., L90 statistic, etc.) of the background noise level in this particular environment at the plurality of frequency bands. For examples, an example background noise level assigned to a particular environment in a background noise profile could correspond to the sound pressure level exceeded in 90% of the duration of the sound samples collected in that particular environment. Other example statistical computations are possible.

The process 400 then returns to block 402, where blocks 402-412 are repeated until the background noise profiling time period lapses (e.g., block 402 returns a result of YES). For example, lapse of the background noise profiling period could indicate that the example acoustic noise mitigator 312 has collected a sufficient number of samples to generate background noise profiles for a number of frequently visited environments (e.g., the top five environments, etc.) of the computing system 300.

FIG. 5 is a flowchart representative of example machine readable instructions 500 which may be executed to implement the example acoustic noise mitigator of FIG. 3. In particular, the instructions of FIG. 5 enable the acoustic noise mitigator to learn and initialize system noise profiles for a plurality of different system noise configurations.

The example process 500 of FIG. 5 begins at block 502, where the system noise analyzer 314 identifies an untested system configuration. In an initial iteration, the example system noise analyzer 314 identifies a first untested system configuration. In one example, the first system configuration includes a particular combination of dynamic periodicity alternation (DPA) parameter values, voltage regulator slew rate values, and/or other system parameters for operating the one or more electronic components 306. If all possible system configurations have been tested (e.g., block 502 returns a result of NO), then the process 500 terminates. If there are one or more system configurations that have not yet been tested (e.g., block 502 returns a result of YES), then the process 500 proceeds to block 504.

At block 504, the system noise analyzer 314 adjusts a current system configuration to correspond to the untested system configuration. For example, the specific values of the system configuration parameters discussed above can be applied to the computing system 300 (e.g., by updating BIOS settings, updating a SoC configuration, updating a driving circuitry configuration, etc.).

At block 506, the example system noise analyzer 314 performs a test workload operation. For example, the example noise analyzer 314 could cause the computing system 300 to play a media file or perform other specific test computing operation while operating according to the adjusted system configuration.

At block 508, the example system noise analyzer 314 collects a sound sample while performing the test workload operation. For example, the process 500 could be performed in a quiet testing environment (e.g., anechoic chamber, etc.). Further, the example system noise analyzer 314 obtains the sound sample at block 508 from the sound sensor 302. In this example, the collected sound sample may be indicative of acoustic noise (e.g., vibrations, etc.) caused by the operation of the one or more electronic components 306 according to the system configuration of the selected system noise profile.

At block 510, the system noise analyzer 314 determines spectral components of the sound sample for a plurality of frequency bands, similarly to the spectral components determined in the description of block 410 of the process 400 illustrated in FIG. 4.

At block 512, the system noise analyzer 314 generates a system noise profile for the system configuration based on the determined spectral components of the sound sample. In some examples, the system noise analyzer 314 generates the system noise profile in a similar manner as the background noise profile generated by the background noise analyzer 312 in the description of block 412 of the process 400 illustrated in FIG. 4.

Figure 6:
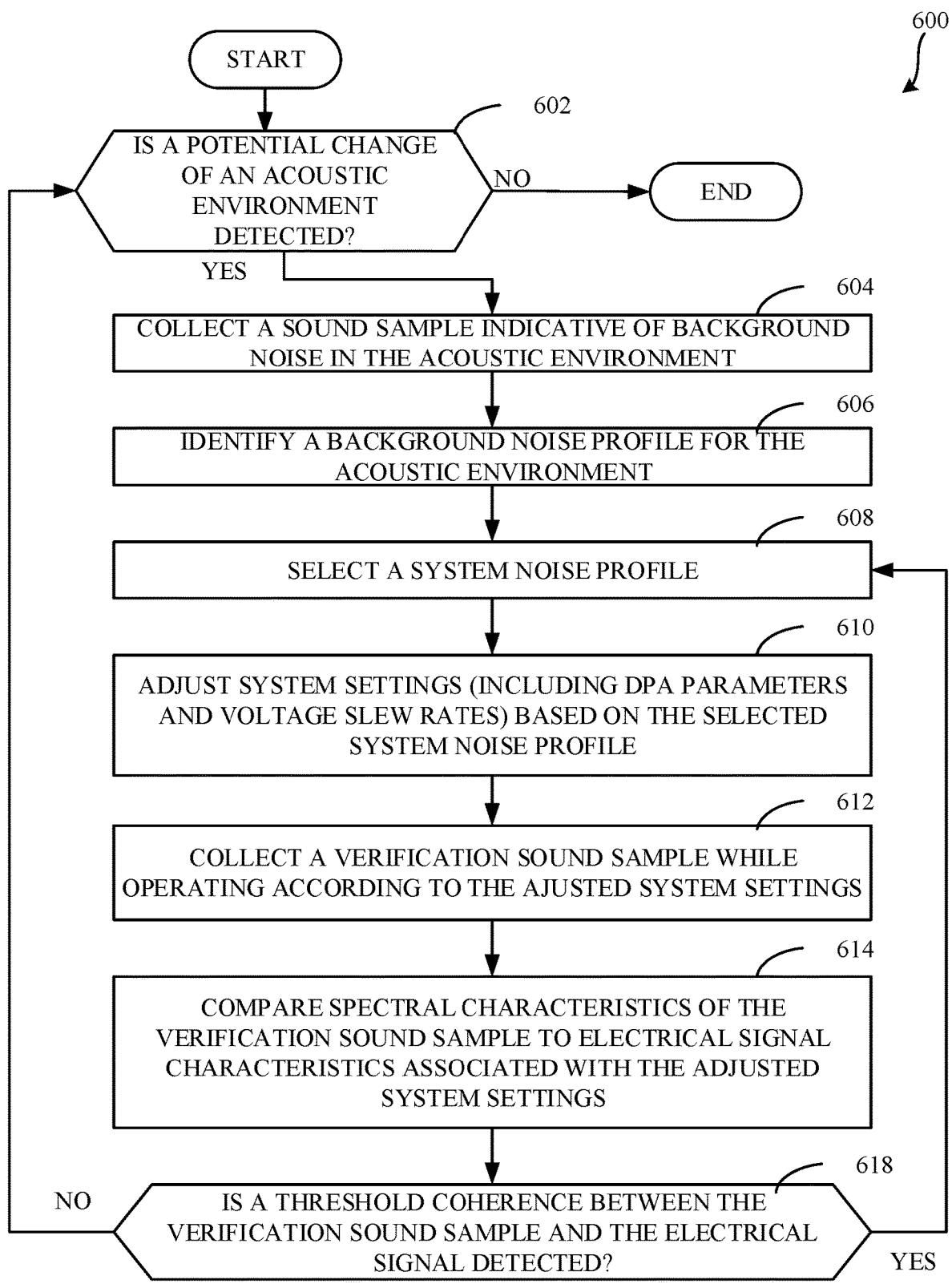
FIG. 6 is a flowchart representative of machine readable instructions which may be executed to implement the example acoustic noise mitigator of FIG. 3 to adaptively control system noise in various acoustic environments.

FIG. 6 is a flowchart representative of example machine readable instructions 600 which may be executed to implement the example acoustic noise mitigator 310 of FIG. 3. In particular, the instructions of FIG. 6 enable the acoustic noise mitigator to adaptively control system noise in various acoustic environments.

At block 602, the example background noise analyzer 312 determines whether a potential change of an acoustic environment of the computing system 300 is detected. If no event indicating a potential change in the acoustic environment of the computing system 300 was detected, then the process 600 terminates. Otherwise, the process 600 proceeds to block 604. Various examples are possible to trigger the detection of the potential change in the acoustic environment at block 602.

In examples disclosed herein, the background noise analyzer 312 at block 602 detects a system boot up event occurred within a threshold amount of time, and responsively detects that the acoustic environment of the computing system 300 has potentially changed (e.g., block 602 returns a result of YES). In some examples, the background noise analyzer 312 detects occurrence of a time-of-day associated with one particular background noise profile stored in the background noise profile repository 322 (e.g., a time-of-day when the system has frequently been present in a home environment, etc.), and the analyzer 312 responsively detects that the acoustic environment has potentially changed (e.g., block 602 returns a result of YES).

In some examples, the background noise analyzer 312 detects a particular network connection associated with a particular environment using network interface 308 (e.g., a WiFI connection in a previously visited coffee shop, etc.), and responsively detects the change at block 602.

In some examples, the background noise analyzer 312 detects a geographic location associated with a particular environment using location sensor 304, and responsively detects that the acoustic environment has changed (e.g., block 602 returns a result of YES).

At block 604, the background noise analyzer 312 collects a sound sample indicative of background noise in the acoustic environment. For example, the background noise analyzer 312 could obtain sensor data (from sound sensor 302) indicative of the background noise in the current environment.

In some examples, the background noise analyzer 312 determines a background noise profile indicative of the background noise in the current environment based on at least the sensor data. For example, background noise analyzer 312 estimates sound pressure levels for each of multiple ⅓ octave frequency, such as the frequency bands illustrated in FIG. 2. Accordingly, in these examples, determining the background noise profile may involve background noise analyzer 312 determining a plurality of sound pressure levels, in a plurality of frequency bands, of sounds detected by the sound sensor and indicated by the sensor data at block 604.

In some examples, the background noise analyzer 312 determines a plurality of background noise profiles indicative of acoustic background noise in a plurality of environments. For example, the background noise analyzer 312 generates each background noise profile of the plurality by collecting respective sensor data from the sound sensor 302 over time in the plurality of environments, and generating respective background noise profiles for each environment in line with the discussion in the description of the background noise analyzer 312.

In examples disclosed herein, the background noise analyzer 312 associates each background noise profile of the plurality of background noise profiles with a respective geographic location indicated by location sensor 304. The background noise analyzer 312 identifies the current environment at block 604 based at least in part on a current location indicated by the location sensor 304.

In some examples, the background noise analyzer 312 associates the current environment with a particular time-of-day, determines a current time-of-day, and identifies the current environment based on the current time-of-day and the particular time-of-day. Referring back to FIG. 1 for instance, background noise analyzer 312 may associate each of the times-of-day T1, T2, T3, T4, etc., with a corresponding environment (e.g., coffee shop, home, office, etc.) in which computing system 300 is operating.

In some examples, the background noise analyzer 312 detects (via network interface 308) a particular wireless network while computing system 300 is operating in the current environment, and then associates the current environment with detection of the particular wireless network, in line with the discussion in the description of FIG. 3 for the background noise analyzer 312.

At block 606, the background noise analyzer 312 identifies a background noise profile for the acoustic environment. For example, the background noise analyzer 312 compares spectral characteristics (e.g., sound pressure levels at different frequency bands) of the collected sound sample with corresponding spectral characteristics of other sound sample (s) of a particular background noise profile in the background noise profile 322 associated with a same or similar time-of-day as the sound sample collected at block 604.

At block 608, the system noise analyzer 314 selects a system noise profile for operating the computing system 300 in the acoustic environment. In some examples, the system noise analyzer 314 selects a first system noise profile indicative of acoustic noise associated with operating one or more electronic components 306 according to a first system configuration. In some examples, the system noise analyzer 314 at block 608 selects the first system noise profile from a plurality of system noise profiles stored in system noise profile repository 324, in line with the discussion in the description of system noise analyzer 314.

At block 610, the system noise controller 316 adjusts system settings (which may include DPA parameter values and/or voltage slew rate values) based on the selected system noise profile. More generally, for example, the system noise controller 316 operates the one or more electronic components 306 according to the first system configuration of the first system noise profile. In this example, the system noise controller 316 may adjust DPA parameters, voltage ramp rates, and/or other driving signal characteristics of the electrical signals flowing through electronic component(s) 306 to correspond to particular values indicated by the first system configuration of the first system noise profile.

In some examples, the one or more electronic components 306 include a voltage regulator. In these examples, system noise controller 316 operating the one or more electrical components 306 at block 610 could involve adjusting a slew rate of the voltage regulator.

In some examples, the system noise controller 316 operating the one or more electrical components 306 involves adjusting a dynamic periodicity alteration (DPA) configuration of the one or more electronic components, in line with the discussion above in the description of system noise controller 316 of FIG. 3.

At block 612, the noise masking verifier 318 collects a verification sound sample while operating according to the adjusted system settings. Then, at block 614, the noise masking verifier 318 compares spectral characteristics of the verification sound sample to electrical signal characteristics associated with the adjusted system settings.

At block 618, if a threshold coherence and/or similarity between the verification sound sample and the electrical signal is detected (e.g., block 618 returns a result of YES), then the noise masking verifier 318 selects another system noise profile by returning to block 608. For example, coherence of the verification sound sample and the electrical signal may be calculated on a scale of zero to one, where zero represents no coherence (e.g., no similarity) and one represents complete coherence (e.g., matching signals). In such an example, the threshold coherence may be set to one half (e.g., 0.5). However, any other threshold coherence value may additionally or alternatively be used. In some examples, a different system noise profile (that has a lower coherence with the background noise) could be selected based on the comparison at block 614. If the threshold coherence is not detected (e.g., block 618 returns a result of NO), then the process 600 returns to block 602.

Accordingly, in some examples, the noise masking verifier 318 at block 612 could obtain second sensor data from sound sensor 302 indicative of sounds detected by the sound sensor 302 while operating the one or more electronic components 306 according to the first system configuration of the selected system noise profile. The second sensor data could indicate sounds that include background noise as well as system noise caused by the one or more electronic components 306.

In these examples, the machine readable instructions 600 may also involve system noise analyzer 314 selecting a second system noise profile from a plurality of system profiles (e.g., stored in system noise profile repository 324) based on at least the second sensor data.

To facilitate selecting the second system noise profile in these examples, in some examples, the noise masking verifier 318 compares acoustic signal characteristics of the second sounds indicated by the second sensor data with electrical signal characteristics associated with the first system configuration of the first system noise profile (selected by system noise analyzer 314). To facilitate this, for example, the noise masking verifier 318 may determine coherence between the sounds indicated by the second sensor data and the electrical signals (e.g., voltage rails, etc.) driving the electronic component(s) 306. In this example, if the determined coherence exceeds a threshold (e.g., 90%, etc.), then system noise analyzer 314 could select the second system noise profile in line with the discussion above.

Figure 7:
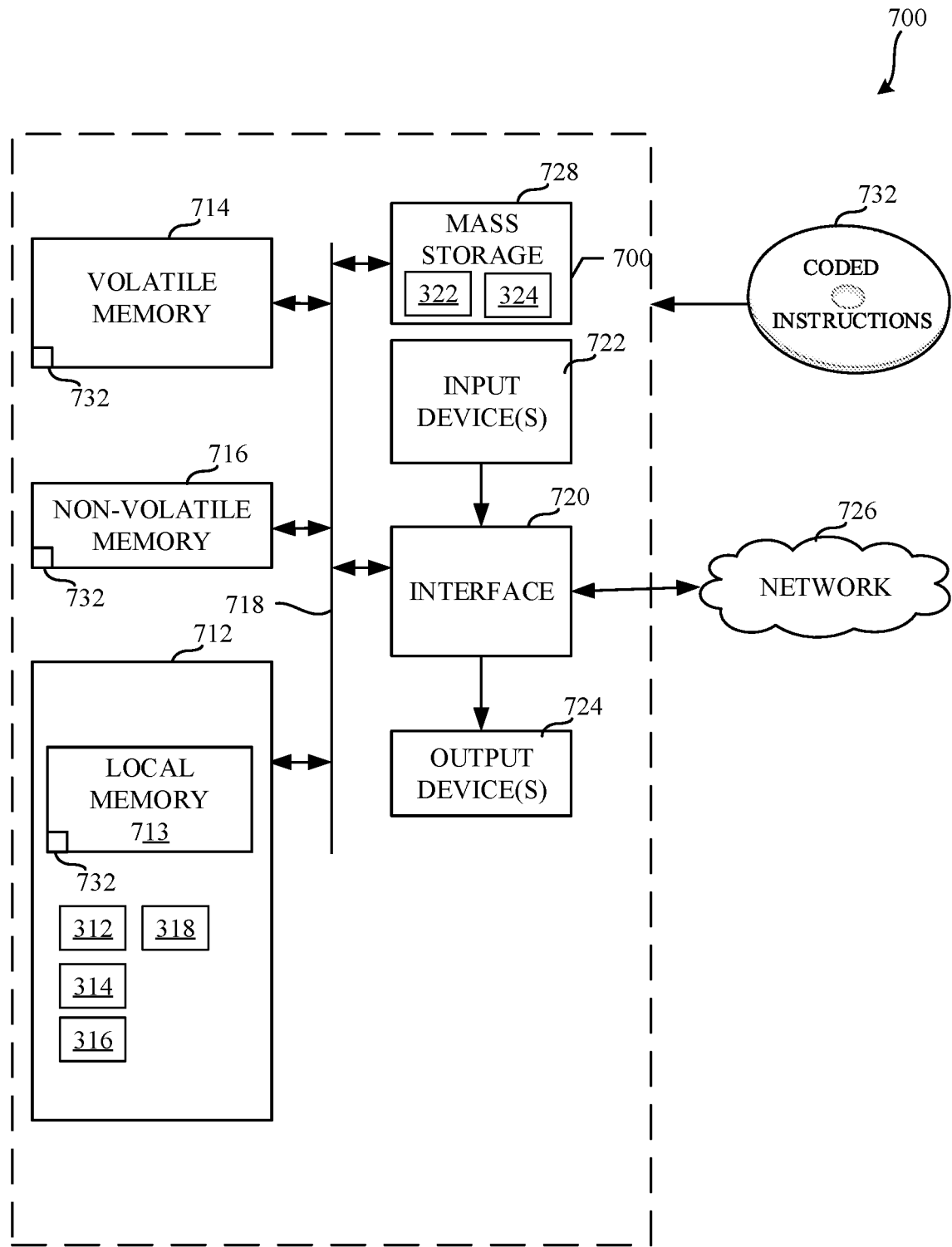
FIG. 7 is a block diagram of an example processor platform structured to execute the instructions of FIG. 4 to implement the example acoustic noise mitigator of FIG. 3.

FIG. 7 is a block diagram of an example processor platform 700 structured to execute the instructions of FIGS. 4, 5, and/or 6 to implement the acoustic noise mitigator 310 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example background noise analyzer 312, the example system noise analyzer 314, the example system noise controller 316, and the example noise masking verifier 318.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 724 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the example background noise profile repository 322 and the example system noise profile repository 324 could be stored in the one or more storage devices 728.

The machine executable instructions 732 of FIGS. 4, 5, and/or 6 may be stored in the mass storage device 728, in the volatile memory 714, in the non-volatile memory 716, and/or on a removable non-transitory computer readable storage medium such as a CD or DVD.

Figure 8:
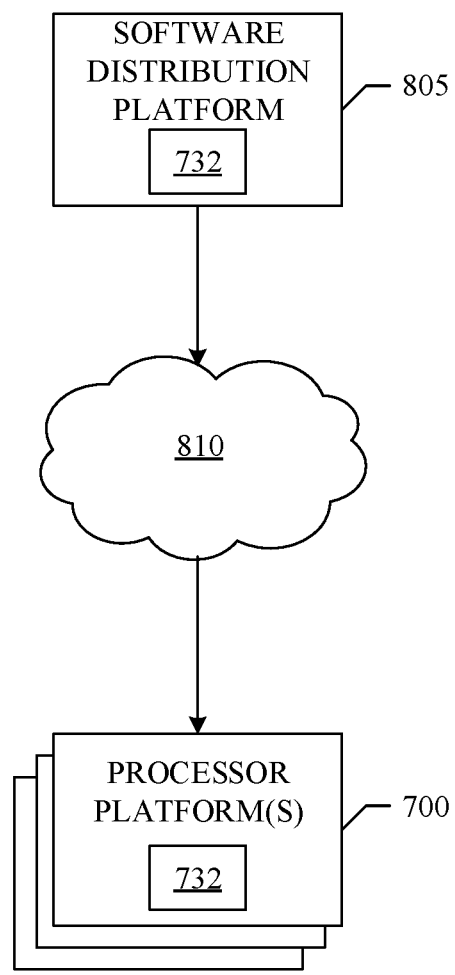
FIG. 8 is a block diagram of an example software distribution platform to distribute software (e.g., software corresponding to the example computer readable instructions of FIGS. 4, 5, and/or 6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/or license the software for use and/or re-sale and/or sub-licensing.

In the illustrated example, the software distribution platform 805 includes one or more servers and one or more storage devices. The storage devices store the computer readable instructions 732, which may correspond to the example computer readable instructions of FIGS. 4, 5, 6, and/or 7, as described above. The one or more servers of the example software distribution platform 805 are in communication with a network 810, which may correspond to any one or more of the Internet and/or any of the example networks 726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions of FIGS. 4, 5, and/or 6, may be downloaded to the example processor platform 700, which is to execute the computer readable instructions 732 to implement the acoustic noise mitigator 310 of FIG. 3. In some example, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

From the foregoing, it will be appreciated that example methods, apparatus and articles of manufacture have been disclosed that enable adaptive mitigation of acoustic noise produced by electronic components of a computing device. This adaptive acoustic noise mitigation may allow increasing device performance during times when background noise levels are greater than system noise levels associated with the increased device performance. The disclosed methods, apparatus and articles of manufacture improve the efficiency of using a computing device by automatically adapting system configuration parameters that affect system noise production depending on the current background noise in the environment. The disclosed methods, apparatus and articles of manufacture are accordingly directed to one or more improvement(s) in the functioning of a computer.

Example methods, apparatus, systems, and articles of manufacture for acoustic noise mitigation of electronic noise using adaptive sensing and control are disclosed herein. Further examples and combinations thereof include the following:

Example 1 includes an apparatus for noise mitigation in an electronic device, the apparatus comprising a sound sensor, a background noise analyzer to obtain, from the sound sensor, sensor data indicative of background noise in an environment of the electronic device, a system noise analyzer to select, based on at least the sensor data, a first system noise profile indicative of acoustic noise associated with operating one or more electronic components according to a first system configuration, and a system noise controller to operate the one or more electronic components according to the first system configuration of the first system noise profile.

Example 2 includes the apparatus of example 1, wherein the one or more electronic components include a voltage regulator, and wherein the system noise controller is to adjust a slew rate of the voltage regulator to operate the one or more electronic components according to the first system configuration.

Example 3 includes the apparatus of example 1, wherein the system noise controller is to adjust a dynamic periodicity alteration (DPA) configuration of the one or more electronic components to operate the one or more electronic components according to the first system configuration.

Example 4 includes the apparatus of example 1, further including a noise masking verifier to obtain second sensor data from the sound sensor, the second sensor data indicating sounds detected by the sound sensor while operating the one or more electronic components according to the first system configuration, wherein the system noise analyzer is to select, based on at least the second sensor data, a second system noise profile indicative of second acoustic noise associated with operating the one or more electronic components according to a second system configuration, and wherein the system noise controller is to operate the one or more electronic components according to the second system configuration of the second system noise profile in response to the system noise analyzer selecting the second system noise profile.

Example 5 includes the apparatus of example 1, further including a background noise profile repository to store a plurality of background noise profiles indicative of acoustic background noise in a plurality of environments, wherein the background noise analyzer is to determine characteristics of the background noise in the environment further based on the stored plurality of background noise profiles.

Example 6 includes the apparatus of example 1, further including a system noise profile repository to store a plurality of system noise profiles indicative of acoustic noise associated with operating the one or more electronic components in a plurality of environments, wherein the system noise analyzer is to select the first system noise profile from the plurality of system noise profiles stored in the system noise profile repository.

Example 7 includes the apparatus of example 1, further including a location sensor to indicate a geographic location of the apparatus, wherein the background noise analyzer is to determine the background noise in the environment based at least in part on the geographic location indicated by the location sensor.

Example 8 includes the apparatus of example 1, further including a network interface to detect a particular network in the environment of the apparatus, wherein the background noise analyzer is to determine the background noise in the environment based at least in part on detection of the particular network in the environment.

Example 9 includes at least one non-transitory computer readable medium comprising instructions that, when executed by at least one processor, cause at least one processor to at least obtain, from a sound sensor of a computing system, sensor data indicative of background noise in an environment of the computing system, select, based on at least the sensor data, a first system noise profile indicative of acoustic noise associated with operating one or more electronic components of the computing system according to a first system configuration, and operate the one or more electronic components of the computing system according to the first system configuration of the first system noise profile.

Example 10 includes the at least one non-transitory computer readable storage medium of example 9, wherein the one or more electronic components include a voltage regulator, and the instructions, when executed, cause the at least one processor to, in order to operate the one or more electronic components according to the first system configuration, adjust a slew rate of the voltage regulator.

Example 11 includes the at least one non-transitory computer readable storage medium of example 9, wherein the instructions, when executed, cause the at least one processor to, in order operate the one or more electronic components according to the first system configuration, adjust a dynamic periodicity alteration (DPA) configuration of the one or more electronic components.

Example 12 includes the at least one non-transitory computer readable storage medium of example 9, wherein the instructions, when executed, cause the at least one processor to obtain, from the sound sensor, second sensor data indicative of sounds detected by the sound sensor while operating the one or more electronic components according to the first system configuration, select, based on at least the second sensor data, a second system noise profile indicative of second acoustic noise associated with operating the one or more electronic components according to a second system configuration, and operate, in response to selection of the second system noise profile, the one or more electronic components of the computing system according to the second system configuration of the second system noise profile.

Example 13 includes the at least one non-transitory computer readable storage medium of example 12, wherein the instructions, when executed, cause the at least one processor to compare acoustic signal characteristics of the second sounds indicated by the second sensor data with electrical signal characteristics associated with the first system configuration of the first system noise profile, wherein the selecting the second system noise profile is further based on the comparison.

Example 14 includes the at least one non-transitory computer readable storage medium of example 13, wherein the selection of the second system noise profile is further based on the comparison indicating coherence between the acoustic signal characteristics and the electrical signal characteristics exceeding a threshold coherence.

Example 15 includes the at least one non-transitory computer readable storage medium of example 12, wherein the instructions, when executed, cause the at least one processor to determine, based on at least the sensor data, a background noise profile indicative of the background noise in the environment, wherein selecting the first system noise profile is further based on the determined background noise profile.

Example 16 includes the at least one non-transitory computer readable storage medium of example 15, wherein the instructions, when executed, in order determine of the background noise profile, cause the at least one processor to determine a plurality of sound pressure levels, in a plurality of frequency bands, of sounds detected by the sound sensor and indicated by the sensor data, wherein the first system noise profile is indicative of a corresponding plurality of sound pressure levels, in the plurality of frequency bands, of the acoustic noise associated with operating the one or more electronic components according to the first system configuration, and select the first system noise profile includes comparing the plurality of sound pressure levels of the background noise profile with the corresponding plurality of sound pressure levels of the first system noise profile.

Example 17 includes the at least one non-transitory computer readable storage medium of example 12, wherein the instructions, when executed, cause the at least one processor to determine, based on at least the sensor data obtained using the sound sensor in the environment and other sensor data obtained using the sound sensor in other environments, a plurality of background noise profiles indicative of acoustic background noise in a plurality of environments, identifying the environment of the computing system, and select, based on the identification of the environment, a particular background noise profile from the plurality of background noise profiles, wherein selecting the first system noise profile is further based on the selection of the particular background noise profile.

Example 18 includes the at least one non-transitory computer readable storage medium of example 17, wherein the instructions, when executed, cause the at least one processor to associate each background noise profile of the plurality of background noise profiles with a respective location indicated by a location sensor of the computer system, and receive, from the location sensor, an indication of a current location of the computing system, wherein identifying the environment is based at least in part on the current location indicated by the location sensor, wherein the selection of the particular background noise profile is based at least in part on the identification of the environment.

Example 19 includes the at least one non-transitory computer readable storage medium of example 17, wherein the instructions, when executed, cause the at least one processor to associate the environment with a particular time-of-day, determine a current time-of-day, and identify the environment based on the current time-of-day and the particular time-of-day associated with the environment.

Example 20 includes the at least one non-transitory computer readable storage medium of example 17, wherein the instructions, when executed, cause the at least one processor to, in order to identify the environment of the computing system detect, via a network interface of the computing system, a particular wireless network while the computing system is operating in the environment, and associate the environment with detection of the particular wireless network.

Example 21 includes a method for noise mitigation in an electronic device, the method comprising obtaining, from a sound sensor of the electronic device, sensor data indicative of background noise in an environment of the electronic device, selecting, based on at least the sensor data and by executing an instruction with at least one processor, a first system noise profile indicative of acoustic noise associated with operating one or more electronic components of the electronic device according to a first system configuration, and operating the one or more electronic components of the electronic device according to the first system configuration of the first system noise profile.

Example 22 includes the method of example 21, wherein the one or more electronic components include a voltage regulator, and wherein operating the one or more electronic components according to the first system configuration includes adjusting a slew rate of the voltage regulator.

Example 23 includes the method of example 21, wherein operating the one or more electronic components according to the first system configuration includes adjusting a dynamic periodicity alteration (DPA) configuration of the one or more electronic components.

Example 24 includes the method of example 21, further including obtaining, from the sound sensor, second sensor data indicative of sounds detected by the sound sensor while operating the one or more electronic components according to the first system configuration, based on at least the second sensor data, selecting a second system noise profile indicative of second acoustic noise associated with operating the one or more electronic components according to a second system configuration, and in response to selection of the second system noise profile, operating the one or more electronic components of the electronic device according to the second system configuration of the second system noise profile.

Example 25 includes the method of example 24, further including comparing acoustic signal characteristics of the second sounds indicated by the second sensor data with electrical signal characteristics associated with the first system configuration of the first system noise profile, wherein selecting the second system noise profile is further based on the comparison.

Example 26 includes the method of example 25, wherein the selecting of the second system noise profile is based on the comparison indicating coherence between the acoustic signal characteristics and the electrical signal characteristics exceeding a threshold coherence.

Example 27 includes the method of example 21, further including based on at least the sensor data, determining a background noise profile indicative of the background noise in the environment, wherein selecting the first system noise profile is further based on the determined background noise profile.

Example 28 includes the method of example 27, wherein the determining of the background noise profile includes determining a plurality of sound pressure levels, in a plurality of frequency bands, of sounds detected by the sound sensor and indicated by the sensor data, wherein the first system noise profile is indicative of a corresponding plurality of sound pressure levels, in the plurality of frequency bands, of the acoustic noise associated with operating the one or more electronic components according to the first system configuration, and wherein selecting the first system noise profile includes comparing the plurality of sound pressure levels of the background noise profile with the corresponding plurality of sound pressure levels of the first system noise profile.

Example 29 includes the method of example 21, further including determining, based on at least the sensor data obtained using the sound sensor in the environment and other sensor data obtained using the sound sensor in other environments, a plurality of background noise profiles indicative of acoustic background noise in a plurality of environments, identifying the environment of the electronic device, and selecting, based on the identification of the environment, a particular background noise profile from the plurality of background noise profiles, wherein selecting the first system noise profile is further based on the selection of the particular background noise profile.

Example 30 includes the method of example 29, further including associating each background noise profile of the plurality of background noise profiles with a respective location indicated by a location sensor of the computer system, and receiving, from the location sensor, an indication of a current location of the electronic device, wherein identifying the environment is based at least in part on the current location indicated by the location sensor, and wherein selecting the particular background noise profile is based at least in part on the identification of the environment.

Example 31 includes the method of example 29 further including associating the environment with a particular time-of-day, determining a current time-of-day, and identifying the environment based on the current time-of-day and the particular time-of-day associated with the environment.

Example 32 includes the method of example 29, wherein the identifying of the environment of the electronic device includes detecting, via a network interface of the electronic device, a particular wireless network while the electronic device is operating in the environment, and associating the environment with detection of the particular wireless network.

Example 33 includes an apparatus comprising a sound sensor, at least one storage device, and at least one processor to execute instructions that cause the processor to at least obtain, from the sound sensor, sensor data indicative of background noise in an environment of the apparatus, select, based on at least the sensor data, a first system noise profile indicative of acoustic noise associated with operating one or more electronic components according to a first system configuration, and operate the one or more electronic components according to the first system configuration of the first system noise profile.

Example 34 includes the apparatus of example 33, wherein the one or more electronic components include a voltage regulator, and wherein operating the one or more electronic components according to the first system configuration includes adjusting a slew rate of the voltage regulator.

Example 35 includes the apparatus of example 33, wherein operating the one or more electronic components according to the first system configuration includes adjusting a dynamic periodicity alteration (DPA) configuration of the one or more electronic components.

Example 36 includes the apparatus of example 33, wherein the at least one processor is further to obtain, from the sound sensor, second sensor data indicative of sounds detected by the sound sensor while operating the one or more electronic components according to the first system configuration, based on at least the second sensor data, select a second system noise profile indicative of second acoustic noise associated with operating the one or more electronic components according to a second system configuration, and in response to selection of the second system noise profile, operate the one or more electronic components according to the second system configuration of the second system noise profile.

Example 37 includes the apparatus of example 36, wherein the at least one processor is further to compare acoustic signal characteristics of the second sounds indicated by the second sensor data with electrical signal characteristics associated with the first system configuration of the first system noise profile, wherein the selection of the second system noise profile is based on the comparison.

Example 38 includes the apparatus of example 37, wherein the at least one processor is further to select second system noise profile is further based on the comparison indicating coherence between the acoustic signal characteristics and the electrical signal characteristics exceeding a threshold coherence.

Example 39 includes the apparatus of example 37, wherein the at least one processor is further to determine, based on at least the sensor data, a background noise profile indicative of the background noise in the environment, wherein the selection of the first system noise profile is based on the determined background noise profile.

Example 40 includes the apparatus of example 39, wherein the at least one processor is further to determine the background noise profile by determining a plurality of sound pressure levels, in a plurality of frequency bands, of sounds detected by the sound sensor and indicated by the sensor data, wherein the first system noise profile is indicative of a corresponding plurality of sound pressure levels, in the plurality of frequency bands, of the acoustic noise associated with operating the one or more electronic components according to the first system configuration, and wherein selecting the first system noise profile includes comparing the plurality of sound pressure levels of the background noise profile with the corresponding plurality of sound pressure levels of the first system noise profile.

Example 41 includes the apparatus of example 37, wherein the at least one processor is to determine, based on at least the sensor data obtained using the sound sensor in the environment and other sensor data obtained using the sound sensor in other environments, a plurality of background noise profiles indicative of acoustic background noise in a plurality of environments, identify the environment of the computing system, and select, based on the identification of the environment, a particular background noise profile from the plurality of background noise profiles, wherein the selection of the first system noise profile is based on the selection of the particular background noise profile.

Example 42 includes the apparatus of example 41, wherein the at least one processor is to associate each background noise profile of the plurality of background noise profiles with a respective location indicated by a location sensor of the computer system, and receive, from the location sensor, an indication of a current location of the computing system, wherein the identification of the environment is based at least in part on the current location indicated by the location sensor, wherein the selection of the particular background noise profile is based at least in part on the identification of the environment.

Example 43 includes the apparatus of example 41, wherein the at least one processor is to associate the environment with a particular time-of-day, determine a current time-of-day, and identify the environment based on the current time-of-day and the particular time-of-day associated with the environment.

Example 44 includes the apparatus of example 37, wherein to identify the environment, the at least one processor is to detect, via a network interface of the computing system, a particular wireless network while the computing system is operating in the environment, and associate the environment with detection of the particular wireless network.

Example 45 includes an apparatus comprising means for obtaining, from a sound sensor of a computing system, sensor data indicative of background noise in an environment of the computing system, means for selecting, based on at least the sensor data, a first system noise profile indicative of acoustic noise associated with operating one or more electronic components of the computing system according to a first system configuration, and means for operating the one or more electronic components of the computing system according to the first system configuration of the first system noise profile.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for noise mitigation in an electronic device, the apparatus comprising:
   a sound sensor;
   machine-readable instructions; and
   at least one processor circuit to be programmed by the machine-readable instructions to:
   obtain, from the sound sensor, first sensor data indicative of background noise in an environment of the electronic device;
   select, based on at least the first sensor data, a first system noise profile indicative of acoustic noise associated with operating one or more electronic components according to a first system configuration, the one or more electronic components to include a voltage regulator; and
   operate the one or more electronic components according to the first system configuration of the first system noise profile to cause the electronic device to be dynamically operated with a different system performance level with reference to the background noise in the environment, wherein operating the one or more electronic components of the electronic device includes adjusting a slew rate of the voltage regulator to operate the one or more electronic components according to the first system configuration.

2. The apparatus of claim 1, wherein one or more of the at least one processor circuit is to adjust a parameter of a dynamic periodicity alteration (DPA) configuration of the one or more electronic components to operate the one or more electronic components according to the first system configuration, wherein to adjust the parameter of the DPA further includes to modulate electrical signals flowing through the one or more electronic components.

3. The apparatus of claim 1, wherein one or more of the at least one processor circuit is to:
obtain second sensor data from the sound sensor, the second sensor data indicating sounds detected by the sound sensor while operating the one or more electronic components according to the first system configuration;
select, based on at least the second sensor data, a second system noise profile indicative of second acoustic noise associated with operating the one or more electronic components according to a second system configuration; and
operate the one or more electronic components according to the second system configuration of the second system noise profile in response to selecting the second system noise profile.

4. The apparatus of claim 1, further including a background noise profile repository to store a plurality of background noise profiles indicative of acoustic background noise in a plurality of environments, wherein one or more of the at least one processor circuit is to determine characteristics of the background noise in the environment further based on the stored plurality of background noise profiles.

5. The apparatus of claim 1, further including a system noise profile repository to store a plurality of system noise profiles indicative of acoustic noise associated with operating the one or more electronic components in a plurality of environments, wherein one or more of the at least one processor circuit is to select the first system noise profile from the plurality of system noise profiles stored in the system noise profile repository.

6. The apparatus of claim 1, further including a location sensor to indicate a geographic location of the apparatus, wherein one or more of the at least one processor circuit is to determine the background noise in the environment based at least in part on the geographic location indicated by the location sensor.

7. The apparatus of claim 1, further including a network interface to detect a particular network in the environment of the apparatus, wherein one or more of the at least one processor circuit is to determine the background noise in the environment based at least in part on the detection of the particular network in the environment.

8. At least one non-transitory computer readable storage medium comprising instructions to cause at least one processor circuit to at least:
obtain, from a sound sensor of a computing system, first sensor data indicative of background noise in an environment of the computing system;
select, based on at least the first sensor data, a first system noise profile indicative of acoustic noise associated with operating one or more electronic components of the computing system according to a first system configuration, the one or more electronic components include a voltage regulator; and
operate the one or more electronic components of the computing system according to the first system configuration of the first system noise profile to cause the computing system to be dynamically operated with a different system performance level with reference to the background noise in the environment, wherein operating the one or more electronic components of the computing system includes adjusting a slew rate of the voltage regulator to operate the one or more electronic components according to the first system configuration.

9. The at least one non-transitory computer readable storage medium of claim 8, wherein the instructions are to cause one or more of the at least one processor circuit to, in order to operate the one or more electronic components according to the first system configuration, adjust a parameter of a dynamic periodicity alteration (DPA) configuration of the one or more electronic components, wherein to adjust the parameter of the DPA further includes to modulate electrical signals flowing through the one or more electronic components.

10. The at least one non-transitory computer readable storage medium of claim 8, wherein the instructions are to cause one or more of the at least one processor circuit to:
obtain, from the sound sensor, second sensor data indicative of sounds detected by the sound sensor while operating the one or more electronic components according to the first system configuration;
select, based on at least the second sensor data, a second system noise profile indicative of second acoustic noise associated with operating the one or more electronic components according to a second system configuration; and
operate, in response to the selection of the second system noise profile, the one or more electronic components of the computing system according to the second system configuration of the second system noise profile.

11. The at least one non-transitory computer readable storage medium of claim 10, wherein the instructions are to cause one or more of the at least one processor circuit to compare acoustic signal characteristics of the sounds indicated by the second sensor data with electrical signal characteristics associated with the first system configuration of the first system noise profile, wherein the selecting the second system noise profile is further based on the comparison.

12. The at least one non-transitory computer readable storage medium of claim 11, wherein the selection of the second system noise profile is further based on the comparison indicating coherence between the acoustic signal characteristics and the electrical signal characteristics exceeding a threshold coherence.

13. The at least one non-transitory computer readable storage medium of claim 10, wherein the instructions are to cause the at least one processor circuit to determine, based on at least the first sensor data, a background noise profile indicative of the background noise in the environment, wherein selecting the first system noise profile is further based on the determined background noise profile.

14. The at least one non-transitory computer readable storage medium of claim 13, wherein the instructions are to cause, in order to determine the background noise profile, one or more of the at least one processor circuit to:
determine a plurality of sound pressure levels, in a plurality of frequency bands, of sounds detected by the sound sensor and indicated by the first sensor data, wherein the first system noise profile is indicative of a corresponding plurality of sound pressure levels, in the plurality of frequency bands, of first acoustic noise associated with operating the one or more electronic components according to the first system configuration; and select the first system noise profile, the selection of the first system noise profile includes comparing the plurality of sound pressure levels of the background noise profile with the corresponding plurality of sound pressure levels of the first system noise profile.

15. The at least one non-transitory computer readable storage medium of claim 10, wherein the instructions are to cause one or more of the at least one processor circuit to:

determine, based on at least the first sensor data obtained using the sound sensor in the environment and other sensor data obtained using the sound sensor in other environments, a plurality of background noise profiles indicative of acoustic background noise in a plurality of environments;

identify the environment of the computing system; and select, based on the identification of the environment, a particular background noise profile from the plurality of background noise profiles, wherein selecting the first system noise profile is further based on the selection of the particular background noise profile.

16. The at least one non-transitory computer readable storage medium of claim 15, wherein the instructions are to cause one or more of the at least one processor circuit to:

associate each background noise profile of the plurality of background noise profiles with a respective location indicated by a location sensor of the computer system; and receive, from the location sensor, an indication of a current location of the computing system, wherein identifying the environment is based at least in part on the current location indicated by the location sensor, wherein the selection of the particular background noise profile is based at least in part on the identification of the environment.

17. The at least one non-transitory computer readable storage medium of claim 15, wherein the instructions are to cause one or more of the at least one processor circuit to:

associate the environment with a particular time-of-day;

determine a current time-of-day; and identify the environment based on the current time-of-day and the particular time-of-day associated with the environment.

18. The at least one non-transitory computer readable storage medium of claim 15, wherein the instructions are to cause one or more of the at least one processor circuit to, in order to identify the environment of the computing system:

detect, via a network interface of the computing system, a particular wireless network while the computing system is operating in the environment; and associate the environment with the detection of the particular wireless network.

19. A method for noise mitigation in an electronic device, the method comprising:

obtaining, from a sound sensor of the electronic device, first sensor data indicative of background noise in an environment of the electronic device;

selecting, based on at least the first sensor data and by executing an instruction with at least one processor, a first system noise profile indicative of acoustic noise associated with operating one or more electronic components of the electronic device according to a first system configuration, the one or more electronic components include a voltage regulator; and operating the one or more electronic components of the electronic device according to the first system configuration of the first system noise profile to cause the electronic device to be dynamically operated with a different system performance level with reference to the background noise in the environment, wherein operating the one or more electronic components of the electronic device includes adjusting a slew rate of the voltage regulator to operate the one or more electronic components according to the first system configuration.

20. The method of claim 19, wherein operating the one or more electronic components according to the first system configuration includes adjusting a parameter of a dynamic periodicity alteration (DPA) configuration of the one or more electronic components, wherein to adjust the parameter of the DPA further includes to modulate electrical signals flowing through the one or more electronic components.

21. The method of claim 19, further including:

obtaining, from the sound sensor, second sensor data indicative of sounds detected by the sound sensor while operating the one or more electronic components according to the first system configuration;

based on at least the second sensor data, selecting a second system noise profile indicative of second acoustic noise associated with operating the one or more electronic components according to a second system configuration; and in response to selection of the second system noise profile, operating the one or more electronic components of the electronic device according to the second system configuration of the second system noise profile.

22. The method of claim 21, further including comparing acoustic signal characteristics of the sounds indicated by the second sensor data with electrical signal characteristics associated with the first system configuration of the first system noise profile, wherein selecting the second system noise profile is further based on the comparison.

* * * * *